US012158118B2

(12) United States Patent
Kern

(10) Patent No.: US 12,158,118 B2
(45) Date of Patent: Dec. 3, 2024

(54) METHOD AND DEVICE FOR USING AND PRODUCING MULTI-DIMENSIONAL CHARACTERISTIC MAPS FOR CONTROLLING AND REGULATING TECHNICAL DEVICES

(71) Applicant: Robert Bosch GmbH, Stuttgart (DE)

(72) Inventor: Andreas Kern, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 152 days.

(21) Appl. No.: 18/000,602

(22) PCT Filed: Jun. 11, 2021

(86) PCT No.: PCT/EP2021/065755
§ 371 (c)(1),
(2) Date: Dec. 2, 2022

(87) PCT Pub. No.: WO2022/002561
PCT Pub. Date: Jan. 6, 2022

(65) Prior Publication Data
US 2023/0220811 A1 Jul. 13, 2023

(30) Foreign Application Priority Data
Jul. 2, 2020 (DE) ..................... 10 2020 208 321.5

(51) Int. Cl.
*F02D 41/24* (2006.01)

(52) U.S. Cl.
CPC ..... *F02D 41/2416* (2013.01); *F02D 41/2432* (2013.01)

(58) Field of Classification Search
CPC ............. F02D 41/2416; F02D 41/2432; F02D 41/2419
See application file for complete search history.

(56) References Cited

U.S. PATENT DOCUMENTS 5,713,332 A 2/1998 Adler et al.
2010/0162999 A1* 7/2010 Michalske .......... F02D 41/1438 123/478

(Continued)

FOREIGN PATENT DOCUMENTS

DE 102010040873 A1 3/2012

OTHER PUBLICATIONS

International Search Report for PCT/EP2021/065755, Issued Dec. 3, 2021.

*Primary Examiner* — Jared M Bibbee
(74) *Attorney, Agent, or Firm* — NORTON ROSE FULBRIGHT US LLP; Gerard A. Messina

(57) ABSTRACT

A computer-implemented method for operating a technical device with the aid of a multi-dimensional characteristic map. The characteristic map is defined by data points, to each of which a characteristic field value is assigned. For reading out the characteristic map, an output value is determined, as a function of an input variable point to be evaluated for the technical device, with the aid of one-dimensional basis functions, which are assigned to each dimension of a data point. The function values of the one-dimensional basis functions respectively have a monotone curve to a neighboring data point, which has the function value 0, and are outside of the neighboring data point 0. The technical device is operated as a function of the output value.

8 Claims, 4 Drawing Sheets

(56) References Cited

U.S. PATENT DOCUMENTS

| | | | | |
|---|---|---|---|---|
| 2011/0069336 | A1 | 3/2011 | Lin et al. | |
| 2015/0107550 | A1* | 4/2015 | Remele | F02D 19/0649 123/304 |
| 2017/0276087 | A1* | 9/2017 | Behrendt | F02D 41/3082 |
| 2017/0284330 | A1* | 10/2017 | Behrendt | F02D 41/3082 |

* cited by examiner

METHOD AND DEVICE FOR USING AND PRODUCING MULTI-DIMENSIONAL CHARACTERISTIC MAPS FOR CONTROLLING AND REGULATING TECHNICAL DEVICES

FIELD

The present invention relates to a method for using and producing characteristic maps for controlling and regulating various technical devices, in particular in the area of combustion engines, fuel cells and the like.

BACKGROUND INFORMATION

For the purpose of modeling, calibrating and parameterizing technical devices, characteristic maps are often used, which provide an output variable as a function of input variables. Characteristic maps often do not map, or do not map completely, dependencies to be captured with the aid of physical models.

Such a characteristic map may be read out by a control unit, for example in order to obtain a model parameter, a calibration parameter or a correction parameter as an output variable as a function of operating variables and system parameters as input variables.

Such characteristic maps normally assign an associated output value of the output variable to data points of value combinations of multiple input variables, wherein, for a value combination of input variables that does not correspond to a data point, an output value of the output variables is ascertained by linear or bilinear interpolation. The distribution of the data points is normally defined offline during calibration, i.e., prior to use in the technical device, and therefore cannot be adapted afterwards to a changing behavior during the actual operation of the technical device.

German Patent Application No. DE 10 2010 040 873 A1 describes a method for ascertaining at least one output variable, which depends on a number of input variables, the output variable being described as a function of a first subset of the number of input variables by using at least two assignments, wherein the at least two assignments are formed as a function of respectively one discrete tuple of a second subset of the number of input variables, and the at least one output variable is ascertained in that for present values of the input variables of the second subset, a relationship to at least two of the discrete tuples is ascertained, and in that an interpolation is performed between the output variables of the assignments formed as a function of the at least two discrete tuples using the relationship.

U.S. Patent Application Publication No. US 2011/069336 A1 describes a method, comprising an identification of a target simplex from simplexes having points in a device-independent space, wherein each point comprises a corresponding combination of device-dependent inputs, the identification comprising: determining whether a test simplex contains a target result in the device-independent space, wherein, if the test simplex does not contain the target result, another neighboring simplex is selected as the test simplex and the determination is repeated until the target simplex is identified; and interpolating the device-dependent input of the points of the target simplex in order to identify a combination of device-dependent input for the target result.

SUMMARY

The present invention provides a computer-implemented method for providing an output value of an output variable as a function of a value combination of input variables with the aid of a characteristic map, as well as a computer-implemented method for producing a characteristic map.

Additional developments of the present invention are disclosed herein.

According to a first aspect of the present invention, a computer-implemented method for operating a technical device with the aid of a multi-dimensional characteristic map is provided, the characteristic map being defined by data points, to each of which a characteristic map value is assigned. According to an example embodiment of the present invention, for reading out the characteristic map, an output value is determined, as a function of an input variable point to be evaluated for the technical device, with the aid of one-dimensional basis functions, which are assigned to each dimension of a data point, wherein the function values of the one-dimensional basis functions respectively have a monotone curve to a neighboring data point, at which the basis function has the function value 0, and are outside of the region between the data point and the neighboring data point 0, wherein the technical device is operated as a function of the output value.

Furthermore, for an input variable point, the function values of the one-dimensional basis functions of the data points surrounding the input variable point with respect to every dimension are multiplied in order to determine the output value.

Characteristic maps are generally used for the calibration, correction, adaptation and for the modeling of relationships that cannot be physically mapped in a complete manner. A characteristic map assigns a output variable to multiple input variables, which output variable is used in electronic control units of technical devices, in particular combustion engines, fuel cells, autonomous agents and the like.

One feature of the above method according to the present invention is to define the data points of the characteristic map with the aid of basis functions, which allow for a particularly simple production, adaptation and evaluation of the characteristic map. These basis functions may be used regardless of the input dimensionality (number of the mapping input variables of the characteristic map), it being possible to define for each data point of the characteristic map multi-dimensional basis functions as products of one-dimensional basis functions. The data points of the characteristic map correspond in this context to select value combinations of the input variables, to which a specific output value of the characteristic map is in each case directly assigned.

The basis functions are respectively assigned to one dimension of the input variables. The possibility of forming the product of the function values of the basis functions yields a simple interpolation of the output value of the output variable of the characteristic map by products of the one-dimensional basis functions and the determined output values of the output variables at the data points surrounding the queried input variable point.

According to an example embodiment of the present invention, it may be provided that for the computation of the output value for an input variable point having more than two dimensions, multiplication results of function values of the one-dimensional basis functions are stored and used repeatedly.

On account of repeated multiplications, the provision of basis functions as well as the multiplication of the function values of the basis functions for the interpolation of an operating parameter makes it possible to achieve a clear reduction of the number of required multiplications for an interpolation in comparison to conventional interpolation methods.

Furthermore, the data points of the characteristic map may form an unstructured lattice, which comprises basis units as simplexes that connect a number of directly neighboring data points to one another, which is greater by 1 than the dimensionality of the characteristic map, wherein for computing the output value, a transformation of an n-simplex surrounding the input variable point to an n+1 dimensional space is performed as a function of an input variable point and the simplex is transformed to a corresponding unit simplex, wherein the transformation is described by a multiplication with a (n+1)×(n+1) projection matrix, which results from projecting the nodes of the simplex, the output value resulting from the multiplication of the projection matrix with an input variable point complemented by a component having the value 1.

According to one specific embodiment of the present invention, an output value may be extrapolated to an input variable point lying outside of the input variable space in that characteristic map values of multiple edge data points of the characteristic map lying at the edge of the input variable space are summed in a weighted manner, the weighting depending on an angle between the straight line and the path respectively between the edge data points and the input variable point and their distance.

According to a further aspect of the present invention, a system for operating a technical device with the aid of a multi-dimensional characteristic map is provided, the characteristics map being defined by data points, to each of which a characteristic map value is assigned, wherein for reading out the characteristic map, the system is designed to determine an output value as a function of an input variable point to be evaluated for the technical device, with the aid of one-dimensional basis functions, which are assigned to each dimension of a data point, wherein the function values of the one-dimensional basis functions respectively have a monotone curve to a neighboring data point, at which the basis function has the function value 0, and are outside of the region between the data point and the neighboring data point 0, to multiply, for an input variable point, the function values of the one-dimensional basis function of the datapoints surrounding the input variable point with respect to every dimension in order to determine the output value, and to operate the technical device as a function of the output value.

According to a further aspect of the present invention, a computer-implemented method for providing a multi-dimensional characteristic map for operating a technical device is provided, wherein the characteristic map is defined by data points, to each of which a characteristic map value is assigned, an output value being determined as a function of an input variable point to be evaluated for the technical device, with the aid of one-dimensional basis functions, which are assigned to each dimension of an data point, the function values of the one-dimensional basis functions each having a monotone curve to a neighboring data point, which has the function value 0, and being outside of the neighboring data point 0, the characteristic map being calibrated or adapted using one or multiple predefined input variable points and respectively associated output values, in that the characteristic map values at adapted in such a way that the total error between the output values at the input variable points and the output values of the characteristic map is minimized for the input variable points.

It may be provided that the data points of the characteristic map form an unstructured lattice, which comprises basis units as simplexes that connect a number of directly neighboring data points to one another, which is greater by 1 than the dimensionality of the characteristic map, wherein the basis functions of the unstructured lattice are ascertained via the simplexes from selected data points, the density of the distribution of the data points being selected in such a way that the expected behavior of the output value can be mapped by linear interpolation between the data points.

According to a further aspect of the present invention, a system for providing a multi-dimensional characteristic map for operating a technical device is provided, wherein the characteristics map is defined by data points, to each of which a characteristic map value is assigned, an output value being determined as a function of an input variable point to be evaluated for the technical device, with the aid of one-dimensional basis functions, which are assigned to each dimension of an data point, the function values of the one-dimensional basis functions each having a monotone curve to a neighboring data point, at which the basis function has the function value 0, and being outside of the region between the data point and the neighboring data point 0, the system being designed to calibrate or to adapt the characteristic map using one or multiple predefined input variable points and respectively associated output values, in that the characteristic map values at adapted in such a way that the total error between the output values at the input variable points and the output values of the characteristic map is minimized for the input variable points.

BRIEF DESCRIPTION OF THE DRAWINGS

Specific example embodiments of the present invention are explained in greater detail below on the basis of the figures.

DETAILED DESCRIPTION OF EXAMPLE EMBODIMENTS

Figure 1:
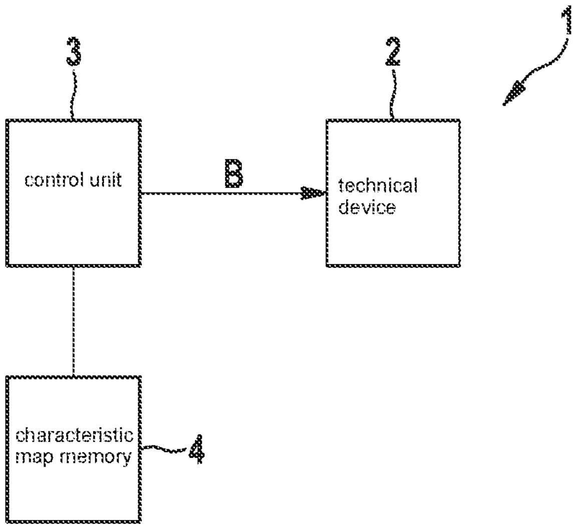
FIG. 1 shows a schematic illustration of a control device with access to a characteristic map memory for operating a technical device, according to an example embodiment of the present invention.

FIG. 1 shows a block diagram for illustrating a system 1 for controlling a technical device 2 with a control unit 3. The control unit 3 is connected to a characteristic map memory 4, in which at least one characteristic map is stored in a parameterized manner.

For operating the technical device 2, control unit 3 provides for ascertaining an operating parameter B, which may represent a correction parameter, an adaptation parameter or a function value of a function mapping a physical behavior. For ascertaining the operating parameter B, the control unit 2 uses the characteristic map in the characteristic map memory 4 and operates the technical device 3 in accordance with the ascertained operating parameter B.

Figure 2:
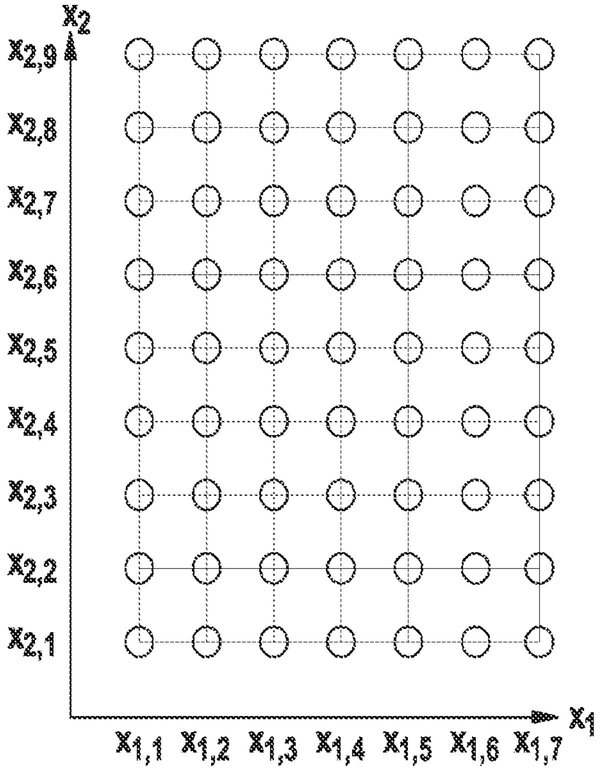
FIG. 2 shows a schematic illustration of a two-dimensional characteristic map, according to an example embodiment of the present invention.

FIG. 2 shows an example for such a characteristic map including input variables x1, x2, which defined a lattice, and an output-side operating parameter as output variable y, the respective output values of which are symbolized by the filled in circles at the lattice intersections. The coordinates, to which respectively an output value of the output variable (of operating parameters to be ascertained) is assigned, correspond to the lattice intersections and are called data points.

For each input variable point, a multi-dimensional basis function is defined, which is a product of the individual basis functions. An output value of the output variable may thus be computed from a characteristic map as:

$$f'(\vec{x}) = \sum_i b_i(\vec{x}) y_i$$

where the index i takes into account each of the data points of the characteristic map lattice.

The basis functions $b_i$ are computed as products of the one-dimensional basis functions at the input value of the respective dimension of the input variable of the characteristic map.

Figure 3:
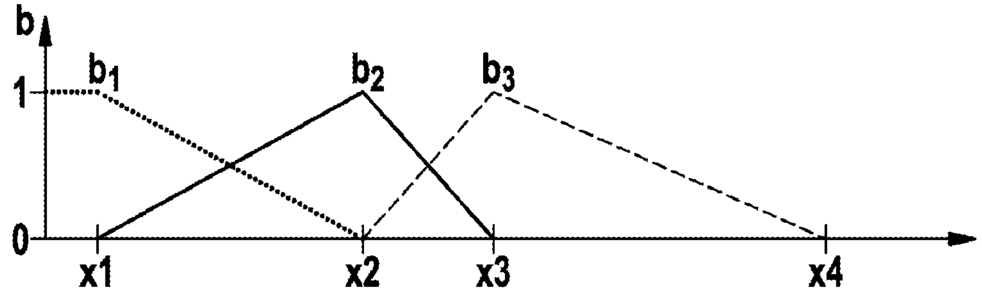
FIG. 3 shows the curve of basis functions with respect to one dimension of the characteristic map, according to an example embodiment of the present invention.

For an individual dimension x, the basis functions, as shown in FIG. 3, correspond to the following definition:

$$\sum_i b_i^x(x) = 1 \forall\, x \in \Omega_x$$

$$b_i^x(x_i) = 1 \forall\, i$$

$$b_i^x(x_k) = 0 \forall\, i \neq k$$

Accordingly, the multi-dimensional basis function is then ascertained by multiplication $$b_i(\vec{x}) = b_i^{x1}(x_1) b_i^{x2}(x_2) \ldots$$

For training such a characteristic map, an output value of the output variable y=f'(x) is assigned to a data point. For this purpose, a learning algorithm receives an operating parameter to be learned at a specific data point $x_1, x_2, \ldots,$ whereby the latter can be used to improve or enter the existing learned values.

After a sufficient number of learning events, the characteristic map may indicate a correct output value of an output variable in accordance with a predefined input variable point (input variable vector). If the characteristic map is to exhibit a PT1 behavior, the output value output by the characteristic map will tend in the direction of the actual operating parameter to be learned, according to:

$$f(\vec{x}) \rightarrow (\vec{x})$$

If an integrating behavior is to be stored, a discrete integral of the input variable point $\vec{x}$ results as the output value of the characteristic map $$f'(\vec{x}) = \sum_\tau f(\vec{x}, \tau) K$$

where K is an integration speed parameter and τ corresponds to the preceding discrete time steps. No continuous function is available, however, as the output f' of the characteristic map; rather, the output values for corresponding input variable points must be approximated on the basis of the characteristic map values at the data points (lattice intersections of the characteristic map or entries at the data points). Hence $$f'(\vec{x}) = \sum_i b_i(\vec{x}) y_i$$

where $b_i(\vec{x})$ are basis functions and $y_i$ the corresponding discrete learned characteristic map values at the data points of the characteristic map.

During an online learning step, a measurement $f(\vec{x})$ is evaluated. First, a residual error δ is computed, which represents the error of the currently learned value. An integrator behavior corresponds to $\delta = f(\vec{x})$. For a PT1 behavior, $\delta = f(\vec{x}) - f'(\vec{x})$, which corresponds to the difference between the characteristic map value of the characteristic map and the output value currently to be learned at the input variable point of the measurement.

Next, the learned characteristic map values $y_i$ at the data points are modified in such a way that $f'(\vec{x})$ corresponds better to the correct output values defined above, i.e. the residual error is compensated. This is achieve in that the basis functions are used as weights for modifying the learned characteristic map values $$y_i \rightarrow y_i + K b_i'(\vec{x}) \delta$$

where K represents a learning speed and to which K in $$f'(\vec{x}) = \sum_\tau f(\vec{x}, \tau) K$$

may correspond as the integration speed parameter.

During the offline learning, the learned characteristic map values $y_i$ are determined in such a way that the outputs $f'(\vec{x})$ agree best with the output value of the characteristic map for the input variable point (evaluation point) $\vec{\beta}$ .

This may be carried out by the method of the smallest squares in accordance with $$\{y_i\}) = \underset{y}{\operatorname{argmin}} \left| X \cdot \vec{y} - \vec{\beta} \right|^2$$

where the matrix elements are given by $$X_{ji} = b_i(\vec{x}_j)$$

The sum operation of the equation $$f'(\vec{x}) = \sum_i b_i(\vec{x}) y_i$$

is performed in every line in the product $x \cdot \vec{y}$.

A learned characteristic map value $y_i$ thus exists for every basis function $b_i(\vec{x})$. These basis functions $b_i(\vec{x})$ are selected in order to span a multi-dimensional volume Ω, in which a learning operation is to be performed.

As seen in FIG. 2, the basis functions are efficiently defined on a structured rectangular data point lattice, which is shown for a two-dimensional characteristic map in the input-side variables x1 and x2.

The lattice points are indicated by all combinations of the points $\{x_1\}$, $\{x_2\}$, i.e. all gray circles in FIG. 2. The rectangle formed in this manner, which is spanned by the data points in two dimensions (cuboid for more than two dimensions) defines the input variable range Ω.

A multidimensional basis function $b_i$ is defined for every lattice point $\vec{x}_1$. The basis functions $b_i$ are computed as products of the one-dimensional basis functions according to every dimension of the input variables of the characteristic map. For an individual dimension x, the basis functions, as shown in FIG. 3, are defined as indicated above. Accordingly, the multi-dimensional basis function is then ascertained by multiplication $$b_i(\vec{x}) = b_i^{x1}(x_1) b_i^{x2}(x_2) \ldots$$

The properties given in the above definition of the basis functions may then be expanded to the higher dimensionalities $$\sum_i b_i^x(\vec{x}) = 1 \forall x \in \Omega_x$$

$$b_i^x(\vec{x}_i) = 1 \forall i$$

$$b_i^x(\vec{x}_k) = 0 \forall i \neq k$$

Figure 4:
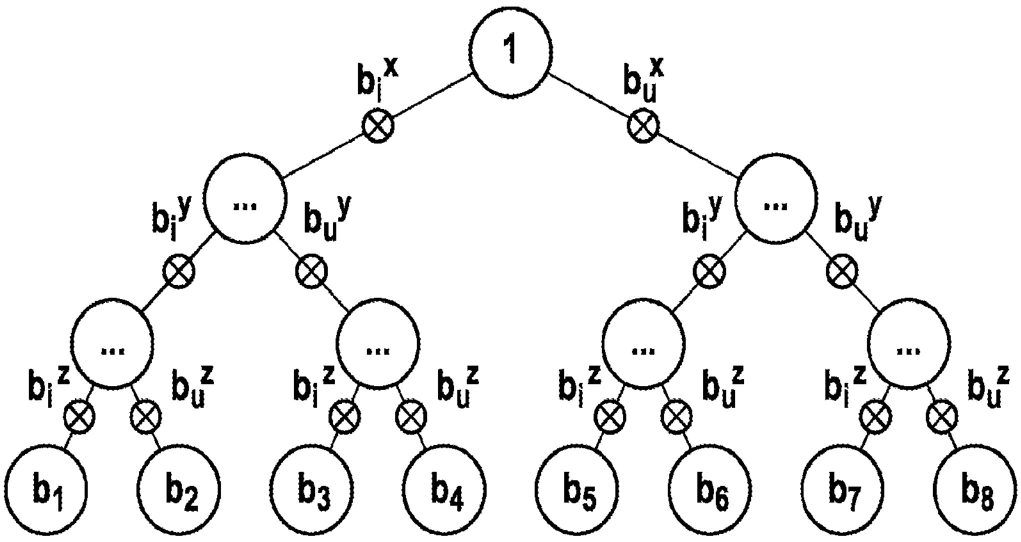
FIG. 4 shows a tree structure for simplifying the computation of the function value of the multi-dimensional basis function, according to an example embodiment of the present invention.

At a certain input variable point $\vec{x}$ the basis functions, which correspond to $2^N$ multi-dimensional data points, are unequal to 0, where N represents the number of dimensions. Thus, $2^N$ learned values are accessed for the interpolation or modified by a learning step. The multi-dimensional data points $\vec{x}_1$ comprise products of the one-dimensional basis functions. For every dimension, the one-dimensional basis functions of a low (index l) and an upper (index u) data point are taken into account, which enclose the input variable point $\vec{x}$ to be evaluated. For example, in the case of three dimensions, the eight ($2^3$) multi-dimensional basis functions correspond to the eight corners of the cuboid, which enclose the input variable point $\vec{x}$:

$b_1 = b_x^l b_y^l b_z^l$, $b_2 = b_x^l b_y^l b_z^u$, $b_3 = b_x^l b_y^u b_z^l$, $b_4 = b_x^l b_y^u b_z^u$
$b_5 = b_x^u b_y^l b_z^l$, $b_6 = b_x^u b_y^l b_z^u$, $b_7 = b_x^u b_y^u b_z^l$, $b_8 = b_x^u b_y^u b_z^u$ where the index "l" corresponds to the lower and the index "u" corresponds to the upper data point. Since products are formed multiple times in the computation of the multi-dimensional basis functions, it is possible to use a computation tree-based approach, as illustrated in FIG. 4, so as to be able to exclude double multiplications. Instead of the $2^N$ (N−1) multiplications, which are given in the above equation, this makes it possible to reduce complexity to $\Sigma_{i=2}^{N} 2^i$ multiplications, which is relevant especially for higher dimensionalities.

An extrapolation of the output value on input variable points to be evaluated that lie outside of the input variable space Ω is performed by projecting the input variable point onto a limit of the input variable space Ω. Since the input variable space Ω is always convex, this projection is unambiguous.

In contrast to the above-described exemplary embodiment, characteristic maps may also be unstructured, i.e. have no hypercuboid contour. This may be expedient if the value of the input variable point (evaluation point) to be learned exists only for a non-cuboid set of data points of the input variable space. In a cubically arranged lattice, it may otherwise happen that the output values to be learned for the input variable points are not distributed over the entire input variable space and that thus some output value are never updated or accessed. This results on the one hand in a waste of resources, since the unused learned operating parameters must be stored, and on the other hand the learned values are not extrapolated in these regions during the readout, since they are not located in the extrapolation region, i.e. are not located outside of the input variable space Ω. Instead, a learned setpoint value, such as e.g. zero, is output in these regions, exactly as in the corresponding extrapolation regions.

In addition, the resolution of the learned values cannot be selected as desired with the aid of the above-described routines. With the aid of rectangular lattices, the data points can only be refined in a dimension-wise manner. The refinement in one dimension will thus be applied to all combinations of the other dimensions, regardless of whether this is necessary or not. This results in a waste of resources, since high resolutions are unnecessarily introduced in operating areas where these are not necessary. Unnecessarily high resolutions may also result in lower performance and noise suppression, since measuring noise is falsely interpreted as spatial variation.

An approach for applying unstructured characteristic maps to the learning algorithm described above is described below. The data point lattices of the characteristic maps may be selected to describe arbitrary forms and resolutions with the aid of simplexes, i.e. 1-D line segments, 2-D triangles, 3-D tetrahedrons etc., as basis units. The approach may be applied to any desired number of dimensions. In the above-described learning and evaluation approach for a cuboid data point distribution, an input variable space Ω may be spanned by the data points of the characteristic map $\vec{x}_i$. For each data point of the characteristic map, a value $y_i$ to be learned is stored. Learning and reading out are performed with the aid of basis functions $b_i(\vec{x})$. The basis functions $b_i(\vec{x})$ are defined as indicated above.

Figure 5:
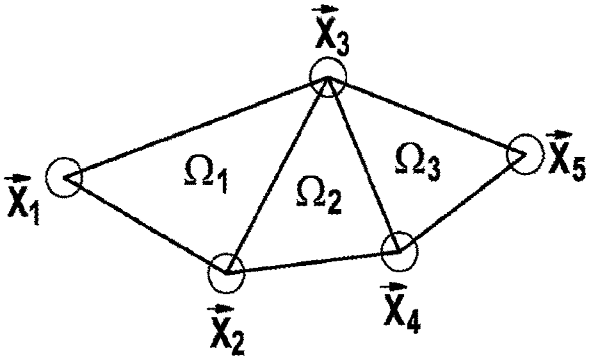
FIG. 5 shows a schematic illustration of an unstructured characteristic map having arbitrarily distributed data points in two dimensions, according to an example embodiment of the present invention.
Figure 6:
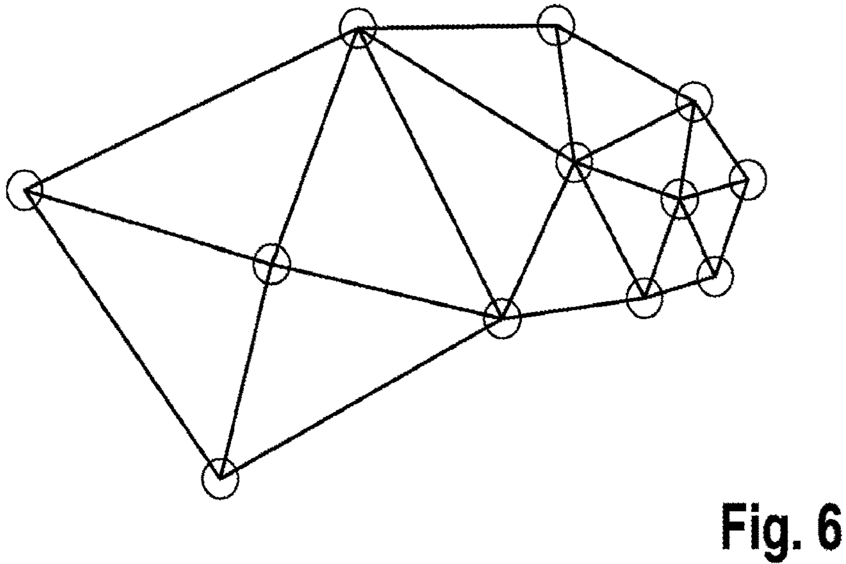
FIG. 6 shows an exemplary form of a data point lattice with local refinement, according to an example embodiment of the present invention.
Figure 7:
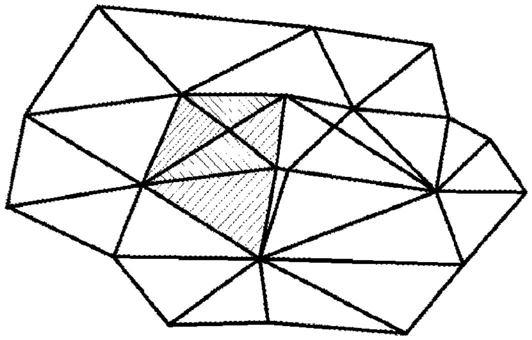
FIG. 7 shows an illustration of linear basis functions of an unstructured two-dimensional characteristic map, according to an example embodiment of the present invention.

Above, the data points were defined on a rectangular characteristic map lattice, which is defined by the individual data points for every dimension. For the application of the approach described above, the data points of unstructured characteristic maps are spanned by independent data points, as shown in FIG. 5 by way of example. Every data point $\vec{x}_i$ is described by a vector that is independent of all other data points. Lattice cells $\Omega_k$ are defined as simplexes, which connect n+1 data points with one another. Such a data point lattice may take an arbitrary form and may be refined locally, as is illustrated by way of example in FIG. 6. The corresponding linear basis functions are graphically illustrated in FIG. 7 for two dimensions.

Figure 8:
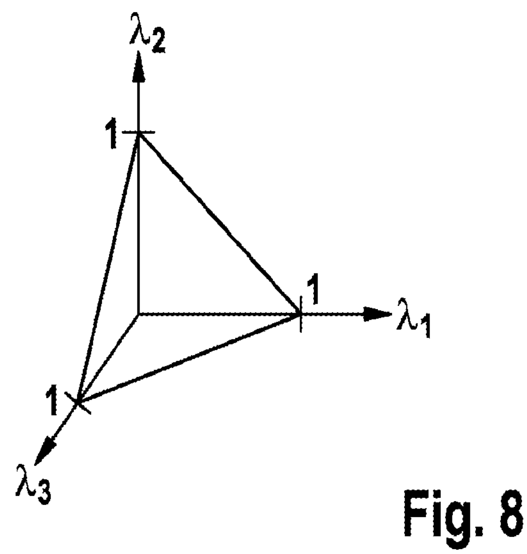
FIG. 8 shows an illustration of a triangle in barycentric coordinates formed by data points of the unstructured characteristic map, according to an example embodiment of the present invention.

The computation of the linear basis functions of unstructured characteristic map lattices may be performed efficiently with the aid of barycentric coordinates. For this purpose, a transformation of an n-simplex into an n+1-dimensional space is performed, and the simplex is transformed onto a corresponding unit simplex. For example, a 2-D triangle may be transformed onto the unit 2-simplex in three dimensions, as shown in FIG. 8. For an arbitrary n-simplex $\Omega_k$, the transformation may be described by a multiplication with a (n+1)×(n+1) matrix.

$$\vec{\lambda}_k = P_k \cdot \vec{x}'$$

Here $\vec{x}'$ corresponds to a (n+1)-dimensional vector as a function of the n-dimensional vector, $\vec{x}$, to which a component with the value 1 is appended, e.g. (x1, x2, 1). The values of $P_k$ are obtained by projecting the nodes of the simplex e.g. for $\Omega_1$ in FIG. 6

$$P_1 \cdot \vec{x}'_1 = (1,0,0),$$

$$P_1 \cdot \vec{x}'_2 = (0,1,0),$$

$$P_1 \cdot \vec{x}'_3 = (0,0,1),$$

i.e., the columns of the inverse matrix $P^{-1}{}_1$ correspond to the coordinates of the nodes of the simplex, to which 1 is appended.

The barycentric coordinates have the following advantages:

Only when an input variable point $\vec{x}$ lies within a simplex $\Omega_k$ or at its limit, do all components of $\vec{\lambda}_k$ become greater than or equal to zero. This may be used for the efficient search for a simplex, in which an evaluation point $\vec{x}$ is located.

The sum of all components of each $\vec{\lambda}_k$ is always 1.

If $\vec{x} \in \Omega_k$, then the components of the projected $\vec{\lambda}_k$ are equal to the values of the linear basis functions according to the corners of the simplex $\Omega_k$ at the input variable point $\vec{x}$. Thus, one obtains the values of the basis functions directly through the transformation to the barycentric coordinates.

The basis functions in unstructured lattices may be ascertained via the simplexes from the selected data points. The data points are selected in such a way that firstly they cover the expected range of the input variable point and that secondly the density of their distribution is sufficiently high that the expected behavior of the output value may be mapped by linear interpolation between the data points.

An extrapolation from the unstructured characteristic map lattices cannot be performed in a simple manner, as described above, because the characteristic map lattice is not necessarily convex and therefore an unambiguous projection onto the limit does not always exist. Accordingly, for unstructured characteristic map lattices, it is proposed to carry out the following method in order to obtain continuous values for data points outside of the discretized input variable space $\Omega$. This makes it possible further to avoid jumps in the output values for continuously changing input variable points.

Figure 9:
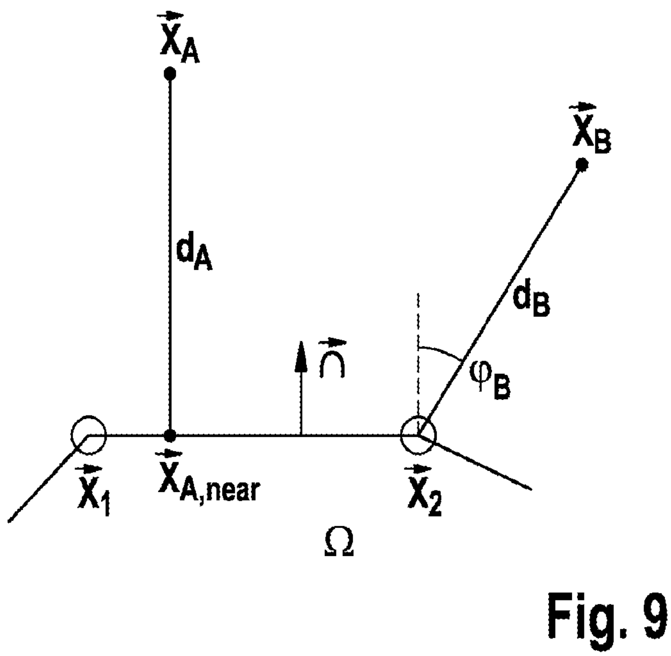
FIG. 9 shows an illustration of the extrapolation in unstructured lattices, according to an example embodiment of to present invention.

The oriented edges $L_k$ form the limit of the input variable space $\Omega$, with the outwardly directed normals $\vec{n}_k$, as illustrated in FIG. 9. For a specific input variable point $\vec{x} \notin \Omega$ to be evaluated, all edges $L_{k,out}$, for which the input variable point $\vec{x}$ is outside of the edge, may be ascertained:

$$(\vec{x} - \vec{x}_k) \cdot \vec{n}_k > 0$$

where $\vec{x}_k$ is a point on the edge $L_k$, e.g. one of the limit nodes. For each of these edges, the edge point $\vec{x}_{near}$ on the edge $L_k$ is determined, which is closest to the input variable point $\vec{x}$ to be evaluated. This point may be on the edge or on a limit node of the edge. The corresponding output value for the extrapolation is the interpolated value at position $\vec{x}_{near}$, whereby a weighting, given by $$\omega_k = \frac{\cos\varphi}{d}$$

is taken into account. Here, d is the Euclidean distance between $\vec{x}$ and the edge point $\vec{x}_{near}$, and δ is the angle between the normal $\vec{n}$ and $(\vec{x} - \vec{x}_{near})$ The extrapolated output value y' may then be computed as $$y' = \frac{\sum_k^{L_{k,out}} y_k \omega_k}{\sum_k^{L_{k,out}} \omega_k}.$$

The invention claimed is:

1. A computer-implemented method for operating a technical device with a control unit and using a multi-dimensional characteristic map stored in a characteristic map memory, the method comprising the following steps:

providing, by the control unit, for an ascertainment of an operating parameter which represents a correction parameter using the characteristic map, an adaptation parameter or a function value of a function mapping a physical behavior and with which the technical device is operated, wherein the characteristic map is defined by data points, to each of which a characteristic field value is assigned;

for reading out the characteristic map, determining an output value as a function of an input variable point to be evaluated for the technical device, using one-dimensional basis functions, which are assigned to each dimension of each data point of the characteristic map, wherein function values of the one-dimensional basis functions respectively have a monotone curve to a neighboring data point, at which the basis function has a function value 0, and are outside of a region between the data point and the neighboring data point 0, wherein, for the input variable point to be evaluated, the function values of the one-dimensional basis functions of the data points surrounding the input variable point with respect to every dimension are multiplied in order to determine the output value; and operating the technical device as a function of the output value.

2. The method as recited in claim 1, wherein the input variable point has more than two dimensions, and wherein for computation of the output value for the input variable point having more than two dimensions, multiplication results of function values of the one-dimensional basis functions are stored and used repeatedly.

3. The method as recited in claim 1, wherein the data points of the characteristic map form an unstructured lattice, which includes basis units as simplexes that connect a number of directly neighboring data points to one another, which is greater by 1 than the dimensionality of the characteristic map, wherein for computing the output value, a transformation of an n simplex surrounding the input variable point to an n+1 dimensional space is performed as a function of an input variable point and the simplex is transformed to a corresponding unit simplex, wherein the transformation is described by a multiplication with a (n+1)×(n+1) projection matrix, which results from projecting nodes of the simples, the output value resulting from the multiplication of the projection matrix with the input variable point complemented by a component having a value 1.

4. A system for operating a technical device with a control unit and using a multi-dimensional characteristic map stored in a characteristic map memory, the system comprising:

the control unit; and the characteristic map memory in which the multi-dimensional characteristic map is stored;

wherein the control unit provides, for ascertainment of an operating parameter which represents a correction parameter with the aid of a characteristic map, an adaptation parameter or a function value of a function mapping a physical behavior and with which the technical device is operated, wherein the characteristic map is defined by data points, to each of which a characteristic field value is assigned, wherein the system is configured to determine, for reading out the characteristic map, an output value, as a function of an input variable point to be evaluated for the technical device, using one-dimensional basis functions, which are assigned to each dimension of each data point of the characteristic map, wherein function values of the one-dimensional basis functions respectively have a monotone curve to a neighboring data point, at which the basis function has a function value 0, and are outside of a region between the data point and a neighboring data point 0, to multiply, for the input variable point, the function values of the one-dimensional basis functions of the data points surrounding the input variable point with respect to every dimension in order to determine the output, and to operate the technical device as a function of the output value.

5. A computer-implemented method for providing a multi-dimensional characteristic map for operating a technical device, wherein the characteristic map is defined by data points, to each of which a characteristic field value is assigned, the method comprising the following steps:

determining an output value as a function of an input variable point to be evaluated for the technical device, using one-dimensional basis functions which are assigned to each dimension of each data point of the characteristic map, wherein function values of the one-dimensional basis functions respectively have a monotone curve to a neighboring data point, at which the basis function has a function value 0, and are outside of a region between the data point and neighboring data point 0;

calibrating or adapting the characteristic map using one or multiple specified input variable points and respectively associated output values in that characteristic map values are adapted so as to minimize a total error between the output values at the input variable points and the output values of the characteristic map for the input variable points.

6. The method as recited in claim 5, wherein the data points of the characteristic map form an unstructured lattice, which includes basis units as simplexes that connect a number of directly neighboring data points to one another, which is greater by 1 than a dimensionality of the characteristic map, wherein the basis functions of the unstructured lattice are ascertained via the simplexes from selected data points, a density of the distribution of the selected data points being selected in such a way that an expected behavior of the output value can be mapped by linear interpolation between the data points.

7. A system for providing a multi-dimensional characteristic map for operating a technical device, wherein the characteristic map is defined by data points, to each of which a characteristic field value is assigned, wherein an output value is determined as a function of an input variable point to be evaluated for the technical device, using one-dimensional basis functions which are assigned to each dimension of each data point of the characteristic map, wherein function values of the one-dimensional basis functions respectively have a monotone curve to a neighboring data point, at which the basis function has a function value 0, and are outside of a region between the data point and a neighboring data point 0, the system being configured to calibrate or to adapt the characteristic map using one or multiple specified input variable points and respectively associated output values by adapting the characteristic map values so as to minimize a total error between the output values at the input variable points and the output values of the characteristic map for the input variable points.

8. A non-transitory machine-readable storage medium on which is stored a computer program for operating a technical device using a multi-dimensional characteristic map stored in a characteristic map memory, the computer program, when executed by a processing unit, causing the processing unit to perform the following steps:

providing, for an ascertainment of an operating parameter which represents a correction parameter using the characteristic map, an adaptation parameter or a function value of a function mapping a physical behavior and with which the technical device is operated, wherein the characteristic map is defined by data points, to each of which a characteristic field value is assigned;

for reading out the characteristic map, determining an output value as a function of an input variable point to be evaluated for the technical device, using one-dimensional basis functions, which are assigned to each dimension of each data point of the characteristic map, wherein function values of the one-dimensional basis functions respectively have a monotone curve to a neighboring data point, at which the basis function has a function value 0, and are outside of a region between the data point and the neighboring data point 0, wherein, for the input variable point to be evaluated, the function values of the one-dimensional basis functions of the data points surrounding the input variable point with respect to every dimension are multiplied in order to determine the output value; and operating the technical device as a function of the output value.

* * * * *